Aug. 24, 1937.   C. M. ELLENBERGER   2,090,833
TIRE COVER
Filed July 21, 1933   2 Sheets-Sheet 1

INVENTOR
Clarence M. Ellenberger
BY *Ira J Adam*
ATTORNEY

Aug. 24, 1937.     C. M. ELLENBERGER     2,090,833
TIRE COVER
Filed July 21, 1933     2 Sheets-Sheet 2
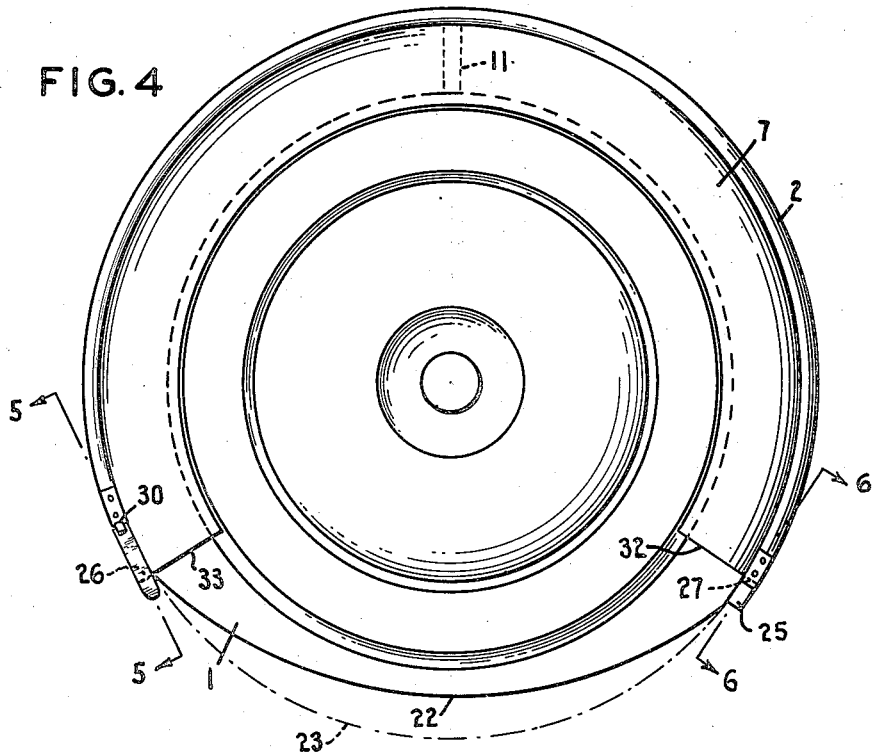
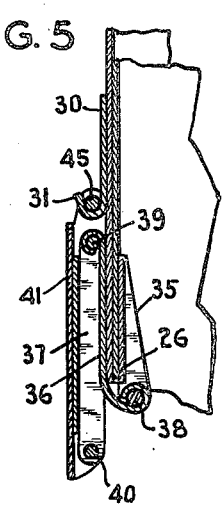
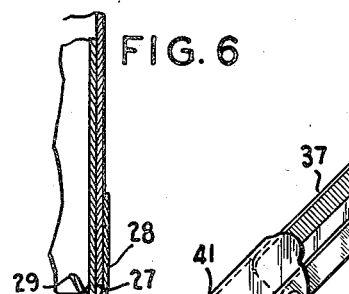
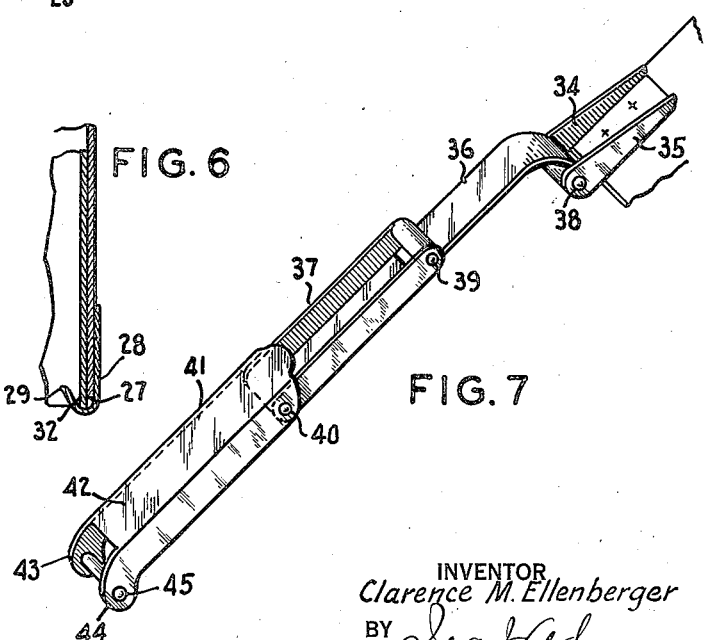
INVENTOR
Clarence M. Ellenberger
BY
ATTORNEY Patented Aug. 24, 1937

2,090,833

UNITED STATES PATENT OFFICE 2,090,833

TIRE COVER

Clarence M. Ellenberger, Jackson, Mich., assignor to Ryerson & Haynes, Inc., a corporation of Michigan Application July 21, 1933, Serial No. 681,415

3 Claims. (Cl. 150—54)

This invention relates to tire covers of the metal type.

An object of the invention is to construct a two piece tire cover consisting of front and back members in which one member has hand operated means to expand outwardly against the inside of the other member.

Other objects will appear in the following description, reference being had to the drawings in which:

Fig. 4 is a rear elevation of a modified form of tire cover.

Fig. 5 is a section of the latch of Fig. 4 taken on the line 5—5.

Fig. 6 is a section of the latch hook taken on the line 6—6 of Fig. 4.

Fig. 7 is a perspective view of the latch in open position.

Figure 1:
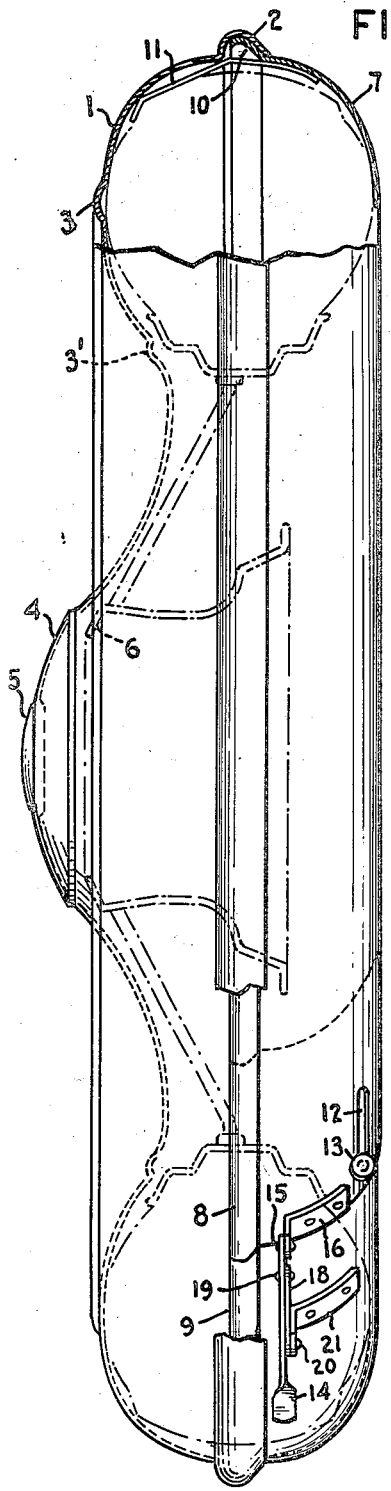
Fig. 1 is a sectional elevation of the improved tire cover, the wheel and tire being shown in outline only.

Referring to Fig. 1, the front plate 1 has an integral bead 2 which may be painted, enameled, plated, burnished or otherwise decorated as desired. The front plate 1 also has side beads 3 and 3' which may be similarly decorated. At the center of the plate is an integral hub disc 4 having a depression to receive an emblem 5 of any sort, such as that of the automobile manufacturer, for example. If one desires to carry an extra hub cap space is provided therefor beneath the hub disc 4 to permit the usual hub cap being snapped into the wheel hub 6.

Figure 3:
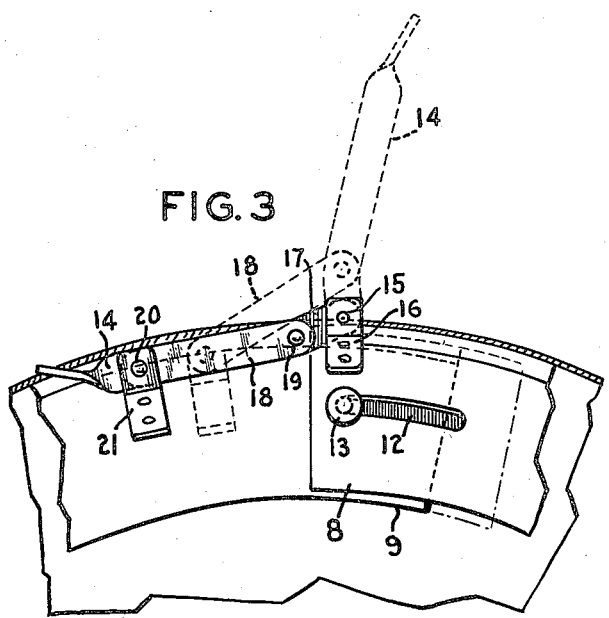
Fig. 3 is a detail of the latching means.

The back member of the tire cover is in the form of split ring 7 with overlapping ends 8, 9 (Fig. 3). This back band is of the deep type covering substantially one-quarter of the side of the tire, as indicated in Fig. 1. The outer periphery of the back ring 7 is beaded at 10 to fit inside the bead 2 of the front plate 1 when it is properly expanded into holding position. A holding hook 11 is spot welded or otherwise fastened to the back ring in position to extend over the top of the tire, as shown in Fig. 1. This hook holds the back ring in position on the tire when the operator is manipulating the front plate 1 in position thereover.

The end 8 of the back ring has a slot 12 in which is slidably arranged a headed rivet 13 fastened in the other end 9. This slot and rivet arrangement permits the ring to contract and expand, but this rivet and slot may be omitted.

To contract and expand the ring a handle 14 is pivoted at 15 to an ear 16 riveted to the end 8. The handle 14 is bent slightly so that the pivoted end 17 extends at an angle to the rest of the handle. A link 18 is pivoted at 19 to the handle 14 and at 20 to an ear 21 riveted or spot welded or otherwise fastened to the end 9 in the back ring.

To place the tire cover on a spare tire assumed to be on the wheel bolted to a bracket at the rear of an automobile, the back band 7 will be placed over the bracket (not shown) before the wheel is secured thereto. The operator will place the back band 7 in position with the hook 11 extending over the top of the tire. This will hold the back ring in place while the operator is assembling the front plate 1 with the bead 2 over the bead 10 of the back ring. Before this is done, however, the handle 14 will be moved to contract the ring, as indicated by the dotted lines in Fig. 3. This will permit the passage of the bead 2 over the inner bead 10. The operator then will move the handle 14 counterclockwise in Fig. 3 to the position shown in full lines. This will expand the back ring and force the inner bead 10 into the trough of the outer bead 2 of the front plate. When the handle is moved into this position the pivot point 19 is below the line connecting the pivot points 15 and 20 in Fig. 3. Therefore the resilient resisting force of the back band or other force exerted thereon will tend to hold the handle 14 down in closed position. The handle therefore will stay closed until force is exerted on the handle itself in clockwise direction to contract the back band.

To remove the tire cover the operation would be reversed.

Figure 2:
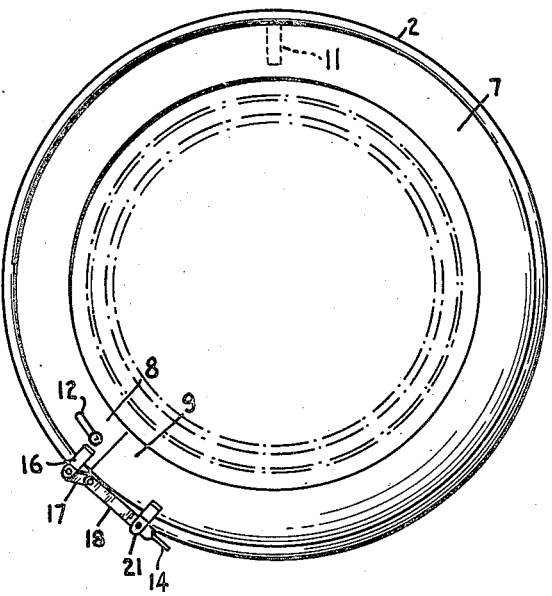
Fig. 2 is a side elevation as viewed from the right of Fig. 1.

In the modification of Fig. 4 the front plate 1 may be made similar to the plate of Fig. 1 but as a modification I have illustrated it as being cut off at the bottom at 22, the dotted line 23 being the outer circumference of the portion removed. This cut-off portion permits the back plate to be removed from the spare tire at the rear of the automobile when the bumper is closely spaced therefrom. The bead 2 at the right hand side of Fig. 4 terminates at 25, 26 due to the bottom of the front plate being cut away. The rear side of the bead 2 is cut further back to the point 27 and to this rear side is welded, riveted or otherwise secured a hook 28 with the hook end 29 extending inwardly towards the tire, as more clearly shown in Fig. 6. Adjacent the end 26 the bead 2 is secured to the hook 30 with the hook end 31 extending outwardly from the tire. The back band 7 in this case is generally shaped like the back band shown in Fig. 2 except that it is cut off at 32, 33. To the inside of the end 33 is secured spaced ears 34, 35, between which is pivoted at 38 a curved link 36. Link 37 is pivoted at 39 to the other link 36. The remaining ends of the link 37 are pivoted at 40 to a handle 41 having a back 42 and depending sides 43, 44. A pin 45 is secured to the ends 43, 44 to act as a catch.

To assemble the cover in position the back band is placed on the tire with the hook 11 engaging the top as already described in connection with Fig. 1. The front plate is then placed in position with the hook end 29 engaging the end 32 of the back ring (Fig. 6). The latch is extended (Fig. 7) and the pin 45 seated in the hook 31. The handle 41 is then pressed downward in Fig. 5 while moving the links 36, 37 past dead center. Further pressure of the handle 41 will then pull downwards on the hook 31 in Fig. 5 and upwards on the pivot pin 38. This will exert tension on the plate 1 in counterclockwise direction in Fig. 4 and at the same time exert tension on the back ring in clockwise direction. The end 32 is thus forced tightly into the hook 29 and the bead 10 of the back band 7 is forced radially outwardly to sit firmly inside the bead 2. This holds the tire cover together on the spare tire.

In the modification of Fig. 4 one is able not only to remove the front plate from the spare tire at the rear of an automobile without removing it from the automobile but also to remove the back band. This is due to the fact that the back band is an incomplete ring.

Having described my invention, what I claim is:

1. In a tire cover, a front member adapted to extend over a portion of the tire and having a circular peripheral bead extending more than half way around the circumference, a split back member adapted to extend over another portion of the tire and having a bead, means to detachably secure one end of one bead to an end of the other bead and a latch secured to one of said members adapted to draw the other ends of the beads relatively in opposite directions and force one bead outwards into the other.

2. In a tire cover, a front plate adapted to extend over the side of the tire and a portion of the tread, a bead on the front plate at its tread periphery extending more than half way around the tread circumference, a split back band adapted to extend over the other side of a tire and the other portion of the tread and having a bead at its periphery, an abutment at one end of one of said beads, a catch at one end of the other bead adapted to engage said abutment, a keeper at the remaining end of one of said beads, and a latch on the remaining end of the other bead adapted to engage said keeper and force one bead outwards into the other.

3. A tire cover structure comprising two separable parts, the sides of one of said parts being regulable for the purpose of assembling said parts upon a tire, means secured to one of said parts adjacent the top thereof for hooking said part on a tire during assembling of the two parts on the tire, camming means on said parts at the adjacent edges thereof, and means for regulating the size of one of said parts to operate said camming means to clamp said parts against the side walls of the tire, said camming means comprising portions angularly disposed to the plane of regulation of the part the size of which is regulated.

CLARENCE M. ELLENBERGER.